United States Patent [19]

Rumpeltin et al.

[11] Patent Number: 5,366,944
[45] Date of Patent: Nov. 22, 1994

[54] VIBRATABLE REFRACTORY COMPOSITIONS

[75] Inventors: Charles R. Rumpeltin, Flanders, N.J.; Julie A. Dody, Easton, Pa.

[73] Assignee: Minteq International Inc., New York, N.Y.

[21] Appl. No.: 112,869

[22] Filed: Aug. 27, 1993

Related U.S. Application Data

[63] Continuation of Ser. No. 847,972, Mar. 6, 1992, abandoned.

[51] Int. Cl.$^5$ ............... C04B 35/04; C04B 35/52
[52] U.S. Cl. ............. 501/99; 501/101; 501/109; 501/119; 501/80
[58] Field of Search ........... 501/108, 107, 118, 80, 501/99, 101, 119

[56] References Cited

U.S. PATENT DOCUMENTS

| | | | |
|---|---|---|---|
| 3,468,750 | 9/1969 | Pfeifer et al. | 161/191 |
| 4,222,782 | 9/1980 | Alliegro et al. | 501/108 X |
| 4,393,143 | 7/1983 | Yoshinaka et al. | 501/109 X |
| 4,427,800 | 1/1984 | Nakamura et al. | 501/108 X |
| 4,431,745 | 2/1984 | Watanabe et al. | 501/109 X |
| 4,508,835 | 4/1985 | Kaniuk et al. | 501/94 |
| 4,703,022 | 10/1987 | Johnson | 501/95 |
| 4,869,468 | 9/1989 | Johnson | 266/44 |
| 5,036,029 | 7/1991 | Johnson | 501/121 |
| 5,061,526 | 10/1991 | Robyn et al. | 501/80 X |
| 5,073,525 | 12/1991 | Cheng et al. | 501/81 |

OTHER PUBLICATIONS

Baker et al., "Aluminosillicate Refractories for Electric Arc Furnace Roofs and Steel Ladles", *Ceramic Bulletin*, vol. 57(7), 667–671 (1978), no month.

Damiano, "Monolithic Refractories: Adapting to Change", *Steel World* 50–53 (1991), no month.

Keran et al., "World Report On Silicon Carbide Blast Furnace Refractories–1987", *Iron and Steel Engineer.* (1987), no month.

*The Making, Shaping and Treating of Steel*, Harold E. McGannon (ed.), U.S. Steel, Ninth Edition, 51–61. (1971), no month.

*The Making Shaping and Treating of Steel*, W. T. Lankford, Jr. et al., U.S. Steel, Tenth Edition, p. 43, 59–60. (1985), no month.

Mack et al., "Latest Refractory Practices in Electric Arc Meeting", pp. 1–19 (1969), no month.

Norton, *Refractories*, Third Edition, (1949), pp. 465–466, 475, 476, no month.

Rigby et al., "Action of Alkali And Alkali–Vanadium Oxide Slagg On Alumina–Silica Refractories" *Journal of The American Ceramic Society*–vol. 45 (2), pp. 68–73 (1962), no month.

Searle, *Refractory Materials: Their Manufacture And Uses*, 1924; pp. 599, 607, 617–618; 297, 184, no month.

*Refractories Manual*, American Foundrymen's Society, 1963, pp. 10–11, no month.

"Tomorrow's Mink–Lined Blast Furnace," 33, *The Magazine of Metals Producing*, Jul. 1968, pp. 81–84; 88.

"Tundish Spray Gunning Mix" Technical Data, (1991), no month.

Nonaka et al., "Robotic Gunning System for Coating A (List continued on next page.)

Primary Examiner—Karl Group
Attorney, Agent, or Firm—Pennie & Edmonds

[57] ABSTRACT

A dry vibratable substantially alkali free refractory composition is disclosed for use as a disposable liner wherein the combination of a powdered metal utilized as a high temperature binder and an organic material utilized as a low temperature binder obviates the use of alkali oxides which previously caused degradation of the permanent refractory liner materials upon which the disposable lining was placed. Low density materials such as expanded inorganic materials can be added to the disclosed compositions to decrease the density. The invention also relates to a method of providing a disposable lining in a vessel having a permanent refractory lining, and to the resulting vessel thereof.

28 Claims, No Drawings

OTHER PUBLICATIONS

Tundish", *Iron and Steel Engineer*, pp. 19–23. (1987), no month.

Watroba, T. S., "A Study Comparing Insulative Tundish Lining Systems at Rouge Steel Company," *Iron & Steelmaker*, Nov. 1988, pp. 49–51, no month.

"Refractories For the Continuous Caster Tundish", *Nalco Technology*, 1981, no month.

"Using High-Density, High Alumina Refractories", *Foundry*, Jul. 1970, pp. 113–114.

*Kaolin Clays and Their Industrial Uses*, J. M. Huber Corp., Chapter 17, part. 4. "Ceramics", pp. 143–144 (1955), no month.

Physical & Chemical Properties 6172-C Insulating Tundish Veneer. (Mar.) 1988).

Physical & Chemical Properties 6819 Insulating Tundish Veneer (Apr. 1988).

"Analysis of Spalled Harbison–Walker Brick Samples", Quigley Co., Inc., Nov. 1986.

*Refractories*, General Refractories Company, 1949, p. 259, no month.

VIBRATABLE REFRACTORY COMPOSITIONS

This is a continuation, of application Ser. No. 07/847,972, filed Mar. 6, 1992, now abandoned.

TECHNICAL FIELD

This invention relates to refractory compositions especially useful for forming a disposable, monolithic lining on the permanent refractory lining of a molten metal vessel. Such vessels include a tundish or ladle, each of which is used in continuous molten metal casting processes. Specifically, the invention relates to a substantially alkali oxide free refractory composition which is typically applied without the addition of water and either with or without the aid of vibration.

BACKGROUND OF THE INVENTION

A tundish is a large intermediate holding vessel for molten metal used in continuous casting processes, such as the continuous casting of steel. The tundish is, in effect, an intermediate process reservoir which receives a large quantity of molten metal from conveying ladles exiting a furnace in which actual smelting of the ores or refining of molten metal occurs, and which then transfers the molten metal to a casting system. A system of inlet and outlet nozzles controls the flow of molten metal into and out of the tundish.

The tundish itself is generally a steel vessel which can be lined with several layers of various refractory compositions. A permanent lining, generally of refractory castable or brick, serves as an inner lining to protect the vessel. The permanent lining, in turn, is coated with a disposable lining, generally of a refractory composition which has been applied to the permanent lining by gunning, spraying, trowelling, or dry vibration. Alternatively, the disposable lining can be constructed of refractory boards. The disposable lining is in direct contact with the molten metal in the tundish and protects the permanent lining from exposure to or degradation by the molten metal.

In general, there are two categories of compositions used as disposable tundish refractory material. The first category includes those refractories which require the addition of a liquid phase, most commonly water, in order to allow the composition to be applied as a tundish lining. Compositions that require a liquid phase are generally applied by trowelling, gunning or spraying. A second category of refractory material may be applied in a dry phase, often requiring vibration of a mold in order to compact the material upon the surface of the permanent liner.

A dry vibratable refractory material may be applied by use of a former, mold or mandrel which corresponds to the contour of the inner dimensions of the tundish, or in a second method, may be applied directly to the permanent lining. The method not requiring a former, namely, the so called "no-former" method, involves preheating the vessel from about 1200° to about 2000° F. Once preheated, the vessel is completely filled with the dry refractory formulation. The refractory is allowed to cure in the vessel for about 1–5 minutes. After this time has elapsed, uncured refractory is reclaimed for reuse and the cured layer forms a substantially uniform disposable liner. By varying the time allowed for curing, the thickness of the disposable lining can be controlled to the amount desired.

During the drying or preheating of sprayable, gunnable, or trowellable refractory liners, there is the possibility that the water within the material may expand too rapidly and cause explosive spalling which can crack the lining. Dry-type refractory materials are not susceptible to such explosive spalling. However, due to the nature of the binders utilized in dry-type refractories of the past, some are less suitable in applications where pre-heating of the tundish is required. Most dry-type refractories experience complete burn-out of low temperature binders at temperatures of 800° to 1100° F. At these temperatures, the high temperature binders have not yet reached their effective binding capabilities. Thus, failures of some disposable liners of the dry-type have occurred when they have been pre-heated prior to casting.

A current problem with refractory materials is that they often contain alkali oxides such as, for example, $Na_2O$ and $K_2O$. It is understood that, at casting temperatures, the alkali oxides present migrate to the disposable/permanent refractory interface. These alkali oxides adsorb and/or absorb onto or into the permanent refractory lining. With each successive application of conventional disposable linings, nephelite forms at the interface. Therefore, damage to the permanent lining can occur during removal of the disposable liner due to the fusion of the linings because of the nephelite formation. Sticking of the disposable lining to the permanent refractory can cause some of the permanent refractory to be lost from the metal vessel when the skull is removed. Furthermore, in those instances where the disposable lining does not stick to the permanent refractory, contamination of the permanent liner by the alkali oxides produces an increased disparity in the coefficient of thermal expansion. This difference in thermal expansion can also result in damage to the permanent lining.

What is needed, therefore, is a substantially alkali oxide free dry vibratable refractory composition which can be used to provide a disposable lining in casting vessels. This composition should also be formulated for use in processes requiring pre-heating of the tundishes such that the material does not exhibit significant spalling, cracking or other temperature-related lining failures.

SUMMARY OF THE INVENTION

In accordance with the present invention, a substantially alkali free dry vibratable refractory composition especially adapted for forming a disposable lining is provided. The composition exhibits high temperature resistance and resistance to spalling and cracking, while also providing increased ease of removal from a permanent refractory lining to which it is applied. The composition is also compatible with pre-heating techniques when used, for example, as a disposable liner in a tundish.

The refractory composition of the present invention includes from about 0.1 to about 20, and preferably about 0.1 to 12 weight percent of a high temperature binder, from about 0.5 to about 5 weight percent of a low temperature binder, from about 0.01 to about 3 weight percent of an inorganic density reducing material and at least about 72 weight percent of a refractory aggregate.

The refractory aggregate is preferably magnesia, doloma, olivine, calcia, alumina, silica, or combinations thereof. It is preferred that the refractory aggregate be magnesia or other source which provides a total MgO equivalent of at least about 50 to 95 weight percent of the aggregate.

The high temperature binder is preferably a metal powder and is utilized to increase the high temperature strength and chemical durability of the refractory material. It is preferred that the powdered metal be aluminum; silicon; an alloy of aluminum and silicon having a weight ratio of from about 50/50 to about 95/5, a mixture of aluminum and silicon having a weight ratio of from about 50/50 to about 95/5, or an alloy of magnesium and aluminum having a weight ratio of from about 80/20 to about 20/80.

Useful low temperature binders include organic materials such as the phenolic resins, with the phenol formaldehyde polymers being especially preferred. Also, the density reducing material is preferably perlite or an expanded inorganic material, such as expanded clay.

From about 0.05 to about 5 weight percent of a volume stabilizer may also be included in the refractory compositions of the invention. The volume stabilizer is preferably a clay selected from the group consisting of bentonite, kaolin clay and ball clay.

DETAILED DESCRIPTION OF THE INVENTION

In the description that follows, all reference to percentage or % refer to percent by weight unless otherwise noted.

As discussed above, dry vibratable refractory materials of the past having incorporated alkali oxide components which have been known to effectively degrade the permanent refractory linings onto which they had been placed. Furthermore, migration of alkalis into permanent lining materials increases the difficulty of deskulling operations, often effecting the loss of portions of the permanent lining which have fused to the disposable lining.

As noted above, the refractory composition of the present invention is a dry vibratable type. It is preferably applied to a surface utilizing vibration for uniform distribution and compaction, with at least one binder being subsequently activated thermally.

The refractory composition of the present invention is substantially alkali free and therefore does not effect the permanent liner degradation and associated problems discussed above. The term "substantially alkali free" means that the refractory composition of the present invention includes a total of less than about 0.1 weight percent of alkali or alkali oxide compounds.

Any of a wide variety of refractory aggregates may be utilized in the compositions of the present invention. These aggregates include basic refractories such as magnesia, doloma, olivine, and calcia. The term "basic" refers to the chemical behavior of these materials rather than the complexity of their composition. In addition, other refractory materials such as alumina and silica may be used.

The most preferred refractory aggregate for the composition is magnesia or other sources which provide at least 50 to 99% MgO, and it is present in an amount of at least about 72 weight percent of the composition. The various particle size ranges of the aggregate may be selected and combined. One skilled in the art is aware of the fact that control of the particle size distribution is important to get efficient packing of the dry vibratable composition. Otherwise, it is possible that segregation of the different size fractions will occur during installation of the lining. Segregation is detrimental to the performance of the lining because, it can cause horizontal laminations which if present can be penetrated by the molten metal. The components (and in particular, the refractory aggregate) can be crushed or ground with the appropriate particle sizes selected to achieve the desired distribution. If necessary, routine tests can be conducted to monitor the particle size distribution of the composition.

The present invention utilizes a high temperature binder comprised of a metal powder. The metallic powders of the present invention provide satisfactory high temperature strength without causing the above-discussed alkali related degradation.

As noted above, any of a wide range of metal powders, alloys or mixtures may be used, with aluminum, silicon, any alloy or mixture of aluminum and silicon, or any alloy of magnesium and aluminum being typical. Advantageous weight ratios of these alloys and mixtures are set forth above. Optimum performance has been found when aluminum/silicon alloys having a greater proportion of aluminum to silicon are used. The most preferred metal powder is an 88Al/12Si alloy having a particle size of less than 44 μm.

The particle size distribution of the metal powder is selected to be commensurate with the size of the aggregate so that efficient packing of the composition occurs during installation. If necessary, routine tests can be conducted to monitor the particle size distribution for any particular metal powder.

Although amounts as high as 20% can be used, the amount of metal powder is typically less than about 6%, with optimum amounts shown in the Examples. The amount of powdered metal effectively adds durability and increased strength to the composition and disposable liner formed therefrom over a temperature range of from about 1100° to 3000° F. More importantly, these powdered metals eliminate the need for binders of alkali bearing compounds.

The composition of the present invention may advantageously include a density reducing inorganic material, such as perlite or expanded clay. A preferred expanded clay is an expanded fire clay having a bulk density of about 25–35 pounds per cubic foot ("p.c.f."). These inorganic additives are preferred compared to organic additives such as paper fibers because it is easier to maintain them in a homogenous blend or dispersion throughout the composition.

The low temperature binder is utilized to hold the composition together once installed and before the high temperature binder becomes activated. Phenolic resins are preferred for use as this component.

Also, a volume stabilizer is included to enhance the ability of linings formed from the composition to shrink upon cooling to facilitate deskulling. Preferably, this component is a clay, such as bentonite or air-floated ball clay.

EXAMPLES

Table 1 lists six compositions which illustrate preferred embodiments of the invention. Composition A and B include an aluminum/silicon alloy as the high temperature binder, and differ only in that composition B includes 1 percent additional expanded fire clay and 0.5 percent less for each of the metal powder and MgO compared to Composition A.

Composition C utilizes a magnesium/aluminum alloy powder as the high temperature binder, while compositions D, E and F illustrate the use of a high temperature binder of aluminum powder, silicon powder, and a mixture of these powders, respectively.

TABLE 1

| Material | A | B | C | D | E | F |
|---|---|---|---|---|---|---|
| MgO | 92 | 91.5 | 92 | 92 | 89 | 92 |
| Phenolic Resin | 3 | 3 | 3 | 3 | 3 | 3 |
| Expanded Fire Clay | 1 | 2 | 1 | 1 | 1 | 1 |
| Air Floated Ball Clay | 1 | 1 | 1 | 1 | 1 | 1 |
| 88 Al/12 Si alloy | 3 | 2.5 | — | — | — | — |
| 50 Mg/50 Al | — | — | 3 | — | — | — |
| Al | — | — | — | 3 | — | 2.25 |
| Si | — | — | — | — | 6 | 0.75 |
| 1500° F. Qualitative Hot Strength Rating* | 4.0 | 4.0 | 2.8 | 2.0 | 2.0 | 2.0 |

*Rating Scale: 1–5 with 5 having the greatest strength.

Table 1 indicates that the qualitative high temperature hot strength test results (which are representative of hardness) for compositions A and B are essentially the same. Both compositions were also found to possess good hot strength and superior slag/steel resistance.

Compared to the single element or powder mixture, the magnesium/aluminum alloy has a better hot strength rating, so that compositions A, B and C are preferred for more aggressive applications. Compositions D, E and F possess lower hot strength ratings, but are useful in processing less aggressive applications.

Refractory compositions made according to this invention, for all modes of application, also demonstrate excellent thermal properties including rapid heat up without spalling.

We claim:

1. A refractory composition for forming a disposable lining consisting essentially of a refractory aggregate; a high temperature binder selected from the group of Al, Al-Si alloys, Al-Si mixtures, and Mg-Al alloys; a phenolic resin binder in an amount sufficient to provide low temperature strength properties to the composition; and a density reducing inorganic material in an amount sufficient to reduce the density of the composition.

2. The composition of claim 1 wherein the refractory aggregate is selected from the group consisting of magnesia, doloma, olivine, calcia, alumina, silica, and combinations thereof, and wherein the composition contains less than about 0.1 weight percent of alkali oxides.

3. The composition of claim 2 wherein the density reducing inorganic material comprises perlite or expanded clay.

4. The composition of claim 1 wherein said Al-Si mixtures have a weight ratio of Al:Si of about 50:50 to about 95:5.

5. The composition of claim 4 wherein said weight ratio of Al:Si is about 88:12.

6. The composition of claim 1 wherein said Mg-Al alloys have a weight ratio of from about 80/20 to about 20/80.

7. The composition of claim 1 wherein said aggregate is a basic refractory.

8. A refractory composition for forming a disposable liner consisting essentially of: from about 0.1 to about 20 weight percent of a high temperature binder selected from the group of Al, Al-Si alloys, Al-Si mixtures, and Mg-Al alloys; from about 0.5 to about 5 weight percent of a phenolic resin binder; from about 0.01 to about 3 weight percent of a density reducing inorganic material; and at least about 72 weight percent of a refractory aggregate.

9. The composition of claim 8 wherein the refractory aggregate is selected from the group consisting of magnesia, doloma, olivine, calcia, alumina, silica, and combinations thereof, and wherein the composition contains less than about 0.1 weight percent of alkali oxides.

10. The composition of claim 8 wherein the high temperature binder is a powdered metal selected from the group consisting of aluminum; silicon; an alloy of aluminum and silicon having a weight ratio of aluminum to silicon of from about 50/50 to about 95/5; a mixture of aluminum and silicon having a weight ratio of aluminum to silicon of from about 50/50 to about 95/5; and an alloy of magnesium and aluminum having a weight ratio of magnesium to aluminum of from about 80/20 to about 20/80.

11. The composition of claim 8 wherein the metal powder comprises aluminum and silicon in a weight ratio of between about 50/50 and 95/5; and the refractory aggregate comprises magnesia.

12. The composition of claim 8 wherein the phenolic resin is a phenol formaldehyde polymer.

13. The composition of claim 8 further comprising a volume stabilizer in an amount of from about 0.05 to about 5 weight percent.

14. The composition of claim 13 wherein the volume stabilizer is a clay selected from the group consisting of bentonite, kaolin clay and ball clay.

15. A refractory composition for forming a disposable liner consisting essentially of: from about 0.1 to about 12 weight percent of a powdered metal binder selected from the group of Al, Al-Si alloys, Al-Si mixtures, and Mg-Al alloys; from about 0.5 to about 5 weight percent of a phenolic resin binder; from about 0.01 to about 3 weight percent of a density reducing inorganic material; from about 0.05 to about 5 weight percent of a volume stabilizer; and at least about 75 weight percent of a refractory aggregate.

16. The composition of claim 15 wherein the refractory aggregate is selected from the group consisting of magnesia, doloma, olivine, calcia, alumina, silica, and combinations thereof, and wherein the composition contains less than about 0.1 weight percent of alkali oxides.

17. The composition of claim 15 wherein the high temperature binder is a powdered metal selected from the group consisting of aluminum; silicon; an alloy of aluminum and silicon having a weight ratio of aluminum to silicon of from about 50/50 to about 95/5; a mixture of aluminum and silicon having a weight ratio of aluminum to silicon of from about 50/50 to about 95/5; and an alloy of magnesium and aluminum having a weight ratio of magnesium to aluminum of from about 80/20 to about 20/80.

18. The composition of claim 15 wherein the density reducing material comprises perlite or an expanded clay.

19. The composition of claim 16 wherein the refractory aggregate comprises magnesia.

20. A method of providing a disposable refractory liner in a vessel having a permanent refractory liner which comprises applying a refractory composition onto the permanent lining to obtain a substantially alkali oxide free disposable liner over the permanent liner, wherein the disposable liner exhibits high temperature strength while simultaneously protecting the permanent liner from degradation and wherein the disposable liner is easily removed from the vessel wherein the refractory composition consists essentially of:

a refractory aggregate selected from the group consisting of magnesia, doloma, olivine, calcia, alumina, silica, and combinations thereof;

a high temperature binder selected from the group of Al, Al-Si alloys, Al-Si mixtures, and Mg-Al alloys;

a phenolic resin binder in an amount sufficient to provide low temperature strength properties to the composition; and a density reducing inorganic material in an amount sufficient to reduce the density of the composition and wherein the refractory composition contains less than about 0.1 weight percent of alkali oxides.

21. The method of claim 20 wherein said composition is adapted for application in a dry state by vibration into place and which hardens by thermal activation of at least one of the binders.

22. A method according to claim 20 wherein the refractory composition consisting essentially of from about 0.1 to about 20 weight percent of the high temperature binder selected from the group of Al, Al-Si alloys, Al-Si mixtures, and Mg-Al alloys;

from about 0.5 to about 5 weight percent of the phenolic resin binder;

from about 0.01 to about 3 weight percent of the density reducing inorganic material; and at least about 72 weight percent of a refractory aggregate.

23. A method according to claim 20 wherein the refractory composition consists essentially of:

from about 0.1 to about 12 weight percent of the high temperature binder selected from the group of Al, Al-Si alloys, Al-Si mixtures, and Mg-Al alloys;

from about 0.5 to about 5 weight percent of the phenolic resin binder;

from about 0.01 to about 3 weight percent of the density reducing inorganic material;

from about 0.05 to about 5 weight percent of a volume stabilizer; and at least about 75 weight percent of a refractory aggregate.

24. A method of providing a disposable refractory liner in a vessel having a permanent refractory liner which comprises:

modifying the properties of a refractory composition that consists essentially of a refractory aggregate;

a phenolic resin binder in an amount sufficient to provide low temperature strength properties to the composition; and a density reducing inorganic material in an amount sufficient to reduce the density of the composition;

by adding a high temperature binder selected from the group of Al, Al-Si alloys, Al-Si mixtures, and Mg-Al alloys, adding a phenolic resin binder in an amount sufficient to provide low temperature strength properties to the composition, and adding a density reducing inorganic material in an amount sufficient to reduce the density of the composition;

applying the composition onto the permanent lining of a molten metal handling vessel to obtain a substantially alkali oxide free monolithic disposable liner over the permanent liner, wherein the disposable liner exhibits high temperature strength while simultaneously protecting the permanent liner from degradation and wherein the disposable liner is easily removed from the vessel.

25. The method of claim 24 wherein said composition is adapted for application in a dry state by vibration into place and which hardens by thermal activation of at least one of the binders.

26. A vessel for handling molten metal comprising:
means for holding molten metal therein;

a relatively permanent refractory lining disposed within the holding means for protecting the holding means against the effects of the molten metal;

and a disposable refractory lining disposed upon at least a portion of the permanent refractory lining wherein the disposable refractory lining consists essentially of:

a refractory aggregate;

a high temperature binder selected from the group of Al, Al-Si alloys, Al-Si mixtures, and Mg-Al alloys;

a phenolic resin binder in an amount sufficient to provide low temperature strength properties to the composition; and a density reducing inorganic material in an amount sufficient to reduce the density of the composition.

27. A vessel according to claim 26 wherein the disposable refractory lining consists essentially of:

from about 0.1 to about 20 weight percent of the high temperature binder;

from about 0.5 to about 5 weight percent of the phenolic resin binder;

from about 0.01 to about 3 weight percent of the density reducing inorganic material; and at least about 72 weight percent of a refractory aggregate.

28. A vessel according to claim 26 wherein the disposable refractory lining consists essentially of:

from about 0.1 to 12 weight percent of the high temperature binder;

from about 0.5 to 5 weight percent of the phenolic resin binder;

from about 0.01 to about 3 weight percent of the density reducing inorganic material;

from about 0.05 to about 5 weight percent of a volume stabilizer; and at least about 75 weight percent of a refractory aggregate.

* * * * *